Aug. 25, 1964 M. CAMRAS 3,145,452

METHOD OF MAKING A MAGNETIC HEAD

Filed March 24, 1958

Inventor

Marvin Camras by Hill, Sherman, Meroni, Gross & Simpson Attys

United States Patent Office 3,145,452
Patented Aug. 25, 1964

3,145,452

METHOD OF MAKING A MAGNETIC HEAD

Marvin Camras, Glencoe, Ill., assignor to IIT Research Institute, a corporation of Illinois Filed Mar. 24, 1958, Ser. No. 723,304
13 Claims. (Cl. 29—155.5)

This invention relates to a method for making a magnetic head, and particularly to a method of making a head of high resistivity material such as ferrite.

It is an object of the invention to provide a method of making a magnetic head having an extremely fine gap, superior high frequency performance and superior wear resistance.

Another object of the invention is to provide a novel method for making a magnetic head particularly adapted for use with ferrite or other high resistivity materials.

Another and further object of the invention resides in the provision of an economical method for producing heads in quantity yet with a very high degree of precision.

Yet another object of the invention resides in the provision of a method of making a magnetic head which accommodates a more precise and less critical assembly procedure than is possible where individual poles of a magnetic head are individually formed.

An important advantage of the present invention resides in the fact that the gap faces are formed to optical flatness while part of a substantially more extended surface area. Very precise optical methods of polishing are available for such extended surfaces which could not be applied to individual gap defining faces of individual poles. The gap material is more readily applied to the more extended surfaces provided by the method of the present invention, and a much more precise gap is formed.

Other objects, features and advantages of the present invention will be apparent from the following detailed description taken in connection with the accompanying drawings, in which.

The present invention is particularly adapted for the forming of magnetic head assemblies from ferrite or high resistivity materal, but can also be used for laminated structures and for applications where thick sections of magnetic material do not have excessive eddy current loss.

Figure 1:
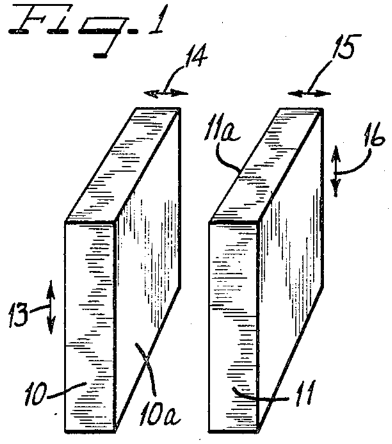
FIGURE 1 is a perspective view illustrating a pair of blocks of magnetic material having confronting surfaces polished to optical flatness.

In accordance with the illustrated embodiment, a pair of ferrite blocks 10 and 11 have surfaces 10*a* and 11*a* thereof polished to optical flatness. By way of example, each block may be one-half inch square by one-quarter inch high (in the direction of arrow 16). For quantity production a much larger area is practical. Single crystal ferrite is ideal to avoid the irregularities and granular structure of sintered ferrite, and preferably as indicated in FIGURE 1 the directions of easy magnetization of the single crystal ferrite blocks are those indicated by the arrows 13, 14, 15 and 16. This orientation is preferred since it is in conformity with the direction of flux paths in the gap subassemblies to be formed from the blocks. With single crystal ferrite material it has been found that much finer gaps can be produced and maintained than are possible with sintered ferrites used in the prior art. However, the same construction is also applicable for less critical work, where fine grain ferrites may be used.

Homogeneous ferrite material, which is not single crystal, or which is of imperfect crystal structure but has the required magnetic qualities (noted below) may be substituted for single crystal material. A preferred gap size is below 5 microns (one micron equals one millionth of a meter), and with care, assemblies with gaps of 0.25 micron or less may be formed.

Figure 2:
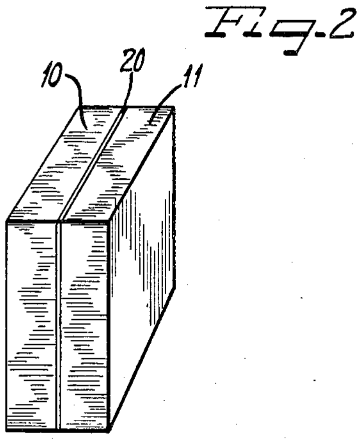
FIGURE 2 illustrates the confronting surfaces secured together at their flat surfaces.

In assembling the blocks as illustrated in FIGURE 2, a gap spacer 20 may be provided by depositing an evaporated film, for example gold in ¼ micron thickness, on one or both of the polished surfaces 10*a* and 11*a*. Alternatively a layer of foil of proper thickness may be used as a gap spacer, and for even finer gaps the spacer may be omitted entirely.

The mating surfaces 10*a* and 11*a* are then coated with epoxy resin of thin consistency and clamped together until the resin has hardened. Alternatively a low melting point "glass" may be used as an adhesive for the mating surfaces. Metals such as indium which wet and adhere to ferrite may also be used. For the very smallest gaps, cement need not be used on the gap faces.

Figure 3:
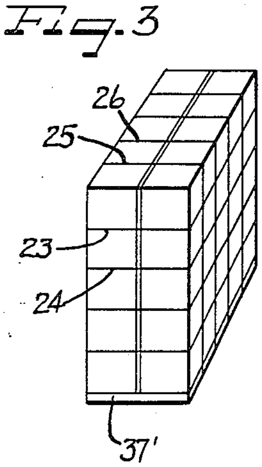
FIGURE 3 is a diagrammatic perspective view illustrating the manner in which the assembly of FIGURE 2 is subdivided to provide a plurality of gap subassemblies.
Figure 4:
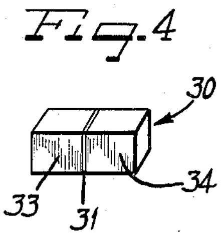
FIGURE 4 is a diagrammatic perspective view of one of the gap subassemblies subdivided as indicated in FIGURE 3.
Figure 5:
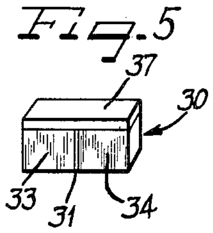
FIGURES 5, 6 and 7 illustrate steps in the finishing of the gap subassembly of FIGURE 4 into a magnetic transducer head pole assembly.

FIGURE 3 illustrates the manner in which the block of FIGURE 2 may be cut along horizontal and vertical planes such as indicated at 23, 24, 25 and 26 to form gap units such as indicated at 30 in FIGURE 4 having gap sections 31 separating ferrite portions such as indicated at 33 and 34. In cases where cementing at the gap is not used reinforcing is applied to at least one side of each gap unit, for example as shown at 37' in FIGURE 3, before the cuts are made.

Figure 6:
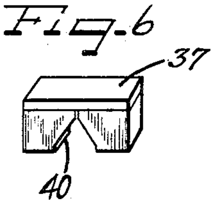

After the step of FIGURES 3 and 4, a reinforcing piece 37 is fastened to one side of the unit 30 so as to allow the removal of material from the other side to reduce the gap facing area as indicated at 40 in FIGURE 6.

Figure 7:
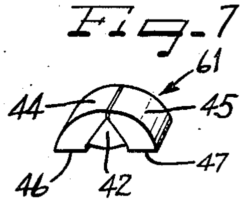

As shown in FIGURE 7, non-magnetic reinforcing material as indicated at 42 is fastened in the notch 40 illustrated in FIGURE 6, while tape receiving surfaces 44 and 45 are shaped, and surfaces such as indicated at 46 and 47 are made flat and coplanar to form a pole assembly 61.

Figure 8:
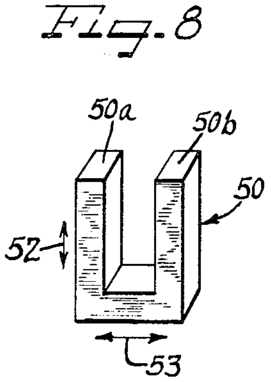
FIGURE 8 illustrates a yoke for receiving the pole piece assembly of FIGURE 7.

As indicated in FIGURE 8, a yoke 50 is formed of ferrite material, with surfaces 50*a* and 50*b* polished flat and in the same plane to receive surfaces 46 and 47 of the pole piece assembly 61 shown in FIGURE 7. By way of example, the yoke 50 may be formed of single crystal ferrite with the directions of easy magnetization as indicated by the arrows 52 and 53 to conform with the flux path in the yoke. However it is preferable to make the yoke of sintered ferrite, which may be "molded" into the correct shape, and which is formed of a composition having superior magnetic properties including high initial permeability, high saturation flux density, and a high enough Curie point to insure stability at normal operating temperatures.

Figure 9:
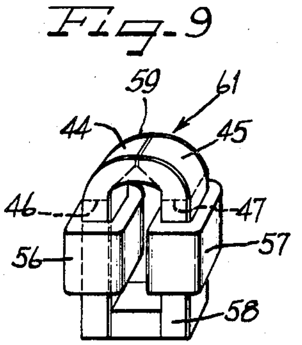
FIGURE 9 illustrates the final assembly of the subunits of FIGURES 7 and 8.

FIGURE 9 illustrates the final assembly with coils 56 and 57 and non-magnetic side plates 58 and 59 applied to the assembly of yoke 50 pole piece assembly 61 of FIGURE 7. The side plates facilitate mounting of the assembly and serve to strengthen and reinforce the gap unit in its mounting with the yoke 50. In many cases, the side plates 58 and 59 may be omitted and surfaces 46 and 47 and 50*a* and 50*b* glued in place.

It will be apparent that many modifications and variations may be effected without departing from the scope of the novel concepts of the present invention.

I claim as my invention:

1. The method of making pole piece assemblies for magnetic heads which comprises polishing to a flat planar configuration surfaces of a pair of blocks of ferrite material, placing said surfaces in confronting relation with a magnetic gap therebetween, securing said blocks to each other by means of a non-magnetic bonding material which is substantially rigidly connected with said blocks and which extends continuously therebetween over substantially the entire area of said confronting surfaces, subdividing the blocks into units each including a portion of one block and a portion of the other block directly across said gap therefrom with a portion of the bonding material being rigidly connected with said portions and extending continuously therebetween to rigidly maintain the dimension of the portion of said magnetic gap therebetween, and shaping said units to provide completed pole piece assemblies for magnetic heads.

2. The method of making pole piece assemblies for magnetic heads which comprises placing a pair of flat planar surfaces of a pair of single crystal ferrite blocks in confronting relation with a magnetic gap therebetween, securing said blocks to each other by means of a non-magnetic bonding material which is substantially rigidly connected with said blocks and which extends continuously therebetween over substantially the entire area of said confronting surfaces, and subdividing the blocks into units each including a portion of one block and a portion of the other block directly across said gap therefrom with a portion of the bonding material being rigidly connected with said portions and extending continuously therebetween to rigidly maintain the dimension of the portion of said magnetic gap therebetween.

3. The method of making pole piece assemblies for magnetic heads which comprises placing a pair of single crystal ferrite blocks with flat planar surfaces thereof in confronting relation and with directions of easy magnetization of said blocks extending at right angles to the interface between said blocks and extending in a direction at right angles to the first direction, securing said blocks to each other by means of a non-magnetic bonding material which is substantially rigidly connected with said blocks and which extends continuously therebetween over substantially the entire area of said confronting surfaces, and subdividing the blocks along orthogonal planes at right angles to said interface to provide pole piece assemblies having directions of easy magnetization corresponding to the directions of flux linkage of the respective pole piece assemblies.

4. The method of making a magnetic head which comprises polishing surfaces of a pair of blocks of single crystal ferrite to substantially optical flatness, placing said surfaces in confronting relation, securing said surfaces to each other by means of a coating on said surfaces over substantially the entire area thereof of a non-magnetic bonding material providing a substantially rigid connection between said surfaces over substantially the entire area of said confronting surfaces, subdividing the blocks into pole piece assemblies each including a portion of one block and a portion of the other block directly opposite thereto with a portion of the non-magnetic bonding material being rigidly connected with said portions and maintaining the confronting surfaces of said portions in fixed relationship, and assembling said pole piece assemblies into completed magnetic heads.

5. The method of making pole assemblies for magnetic heads which comprises polishing an extended surface of each of a pair of members of ferrite magnetic material to a smooth planar condition, placing the extended surfaces of the members in confronting parallel relation with non-magnetic adhesive material directly therebetween, pressing said extended surfaces toward each other with said adhesive material therebetween in a flowable condition and allowing the adhesive to harden and adhere to at least substantially the entire area of said extended surfaces, and cutting said members along planes transverse to said extended surfaces to provide a plurality of pole piece assemblies each including portions of the respective members with said portions of the respective members having confronting parallel faces formed by portions of the respective extended surfaces of said members and with said portions of the respective extended surfaces of said members being separated by a gap formed by the portion of the non-magnetic adhesive material therebetween and with said portion of said adhesive material therebetween adhering to the entire area of said portions of said respective extended surfaces of said members and securing said portions of said respective extended surfaces of said members together in spaced parallel relation to each other.

6. The method of making magnetic heads which comprises polishing an extended surface of each of a pair of ferrite members to a smooth planar condition, placing the extended surfaces of the ferrite members in confronting parallel relation with non-magnetic gap spacer material between said extended surfaces and with adhesive material in a flowable condition located to bond the gap spacer material and the extended surfaces together upon hardening thereof, bonding said extended surfaces of said ferrite members and said non-magnetic gap spacer material together with said extended surfaces of said ferrite members in said confronting parallel relation by allowing said adhesive material to harden, with said non-magnetic gap spacer material substantially filling the space between said extended surfaces, cutting said ferrite members along planes transverse to said extended surfaces to provide a plurality of pole piece assemblies each including portions of the respective ferrite members and said portions of the respective ferrite members having confronting parallel faces formed by portions of the respective extended surfaces of said ferrite members with said portions of the respective extended surfaces of said ferrite members being separated by a portion of said non-magnetic gap spacer material, and assembling the pole piece assemblies with other head components to provide completed magnetic heads.

7. The method of making a magnetic head which comprises polishing an extended surface of each of a pair of ferrite members to a smooth planar condition, placing the extended surfaces of the members in confronting parallel relation, bonding a non-magnetic gap spacer material to the respective extended surfaces of the members thereby to bond the extended surfaces of said ferrite members to each other, with said non-magnetic gap spacer material substantially filling the space between said extended surfaces, cutting said ferrite members along orthogonal planes transverse to said extended surfaces to provide a plurality of pole piece assemblies formed by portions of the respective members with said portions of the respective members having confronting parallel faces formed by portions of the respective extended surfaces of said ferrite members and with said portions of the respective extended surfaces of said ferrite members being separated by a portion of the non-magnetic gap spacer material, and assembling each pole piece assembly with a yoke of magnetic material having windings thereon to form a completed magnetic head.

8. The method of making a magnetic head which comprises polishing an extended area surface of each of a pair of ferrite members to a smooth flat planar condition, placing the extended area surfaces of the ferrite members in confronting parallel relation with a non-magnetic gap spacer material therebetween, bonding the gap spacer material and the surfaces together, severing the members along planes disposed transversely to said confronting parallel extended area surfaces to form a plurality of individual pole piece assemblies each formed from portions of the respective ferrite members and said portions of the respective ferrite members having parallel confronting polar faces separated by a portion of said non-magnetic gap spacer material, securing said pole piece assemblies to a common reinforcing mass of material, shaping the pole piece assemblies into final configuration, and assembling the pole piece assemblies with other head components to provide completed magnetic heads.

9. The method of making a magnetic head which comprises polishing an extended area surface of each of a pair of ferrite members of magnetic material to a smooth flat planar condition, placing the extended area surfaces of the members in confronting parallel relation with a non-magnetic gap spacer material therebetween, bonding the gap spacer material and the surfaces together, severing the members along orthogonal planes disposed transversely to said confronting parallel extended area surfaces to form a plurality of individual pole piece assemblies each formed from portions of the respective ferrite members and said portions of the respective ferrite members having parallel confronting polar faces separated by a portion of said non-magnetic gap spacer material, securing said pole piece assemblies to a common reinforcing mass of material, shaping the pole piece assemblies into final configuration, and assembling each of the pole piece assemblies with a yoke of magnetic material having windings thereon to form a magnetic head.

10. The method of making a magnetic head which comprises polishing an extended area surface of each of a pair of members of ferrite magnetic material to a smooth flat planar condition, placing the extended area surfaces of the members in confronting parallel relation with a non-magnetic gap spacer material therebetween, securing said ferrite members to a common reinforcing mass of material, severing the members along generally orthogonal planes disposed transversely to said confronting parallel extended area surfaces to form a plurality of individual pole piece assemblies each formed from portions of the respective ferrite members and said portions of the respective ferrite members having parallel confronting polar faces separated by a portion of the non-magnetic gap spacer material and said portions of the respective ferrite members being held in fixed relation by a portion of said common reinforcing mass which is secured to one side of said portions of said ferrite member and spans the magnetic gap therebetween, removing material from said portions of the respective ferrite members at the opposite side thereof from said one side to form notches in said portions of the respective ferrite members which reduce the extent of said parallel confronting polar faces of said portions of the respective ferrite members, filling said notches with a non-magnetic reinforcing material to secure said portions of the respective ferrite members in rigid relationship, removing said portion of said common reinforcing mass of material at said one side of said portions of the respective ferrite members and shaping tape receiving surfaces at said one side of said portions of the respective ferrite members and assembling each pole piece assembly with a yoke of magnetic material having windings thereon to form a magnetic head.

11. The method of making magnetic heads which comprises placing an extended planar surface of one block of ferrite material with the surface having an area approximating one-eighth square inch in spaced confronting parallel relation to an extended planar surface of another block of ferrite material with the surface of the other block having an area confronting said area of the surface of said one block approximating one-eighth square inch and with non-magnetic adhesive material directly between the confronting areas of said surfaces, pressing said extended planar surfaces toward each other with said adhesive material therebetween in a flowable condition and allowing the adhesive material to harden and adhere to at least substantially the entire extent of the confronting areas of said surfaces and substantially completely fill the space between said confronting areas of said surfaces with said surfaces rigidly held in confronting parallel relation to each other by said adhesive material therebetween, cutting said blocks along orthogonal planes disposed transversely to said extended planar surfaces to form a plurality of individual pole piece assemblies each comprising a pair of pole pieces formed from portions of the respective blocks of ferrite material and having parallel confronting polar faces rigidly held in spaced confronting relation by a portion of said adhesive material, and assembling the pole piece assemblies with other head components to provide completed magnetic heads.

12. The method of making magnetic heads which comprises selecting a pair of blocks of ferrite magnetic material having edge dimensions approximating one-quarter inch by one-half inch by one-half inch, placing extended planar surfaces of said pair of blocks of ferrite magnetic material in confronting parallel relation with said planar surfaces having area approximating one-eighth square inch and with the interface between said surfaces forming a magnetic gap and with the dimension of each block in the direction at right angles to said interface approximating one-half inch, bonding said surfaces to each other over substantially the entire area of said interface, cutting said blocks along planes at right angles to the interface of the blocks to form a plurality of pole piece assemblies each formed from rectilinear portions of the respective blocks and said rectilinear portions of the respective blocks having parallel confronting polar faces bonded together over substantially the entire area thereof, and assembling the pole piece assemblies with other head components to provide completed magnetic heads.

13. The method of making magnetic heads which comprises selecting a pair of blocks of ferrite magnetic material having edge dimensions approximating one-quarter inch by one-half inch by one-half inch, placing extended planar surfaces of said pair of blocks of single crystal ferrite material in confronting parallel relation with a separation between said surfaces less than 5 microns and with the interface between said surfaces forming a magnetic gap, bonding said surfaces to each other over substantially the entire area of said interface, cutting said blocks along orthogonal planes at right angles to the interface to form a plurality of pole piece assemblies each comprising a pair of pole pieces formed from portions of the respective blocks of single crystal ferrite material and having parallel confronting polar faces bonded to each other over substantially the entire area thereof, and assembling the pole piece assemblies with yokes of magnetic material having windings thereon to form completed magnetic heads.

References Cited in the file of this patent

UNITED STATES PATENTS

| | | |
|---|---|---|
| 2,674,031 | Buhrendorf | Apr. 6, 1954 |
| 2,676,392 | Buhrendorf | Apr. 27, 1954 |
| 2,706,752 | Dupy | Apr. 19, 1955 |
| 2,711,945 | Kornei | June 28, 1955 |
| 2,754,569 | Kornei | July 17, 1956 |
| 2,861,135 | Rettinger | Nov. 18, 1958 |
| 2,866,011 | Kornei | Dec. 23, 1958 |
| 2,906,979 | Bozorth | Sept. 29, 1959 |
| 2,911,481 | Augustin | Nov. 3, 1959 |
| 2,919,312 | Rosenberger et al. | Dec. 29, 1959 |
| 2,933,565 | Neumann | Apr. 19, 1960 |
| 3,024,318 | Duinker et al. | Mar. 6, 1962 |
| 3,049,790 | Camras | Aug. 21, 1962 |

OTHER REFERENCES

Elements of Magnetic Tape Recording, by N. M. Haynes, 1957 Edition, Prentice-Hall, Inc., pages 4–8.